United States Patent [19]

Schlanger

[11] 4,143,735
[45] Mar. 13, 1979

[54] ANTI-NOSE-DIVE SAFETY SYSTEM FOR A VEHICLE

[75] Inventor: Samuel L. Schlanger, Palm Springs, Calif.

[73] Assignees: Gail B. Mauer, Jerusalem, Israel; Ellen R. Cohen, Wayne, N.J.

[21] Appl. No.: 869,333

[22] Filed: Jan. 13, 1978

[51] Int. Cl.² ............................................. B62D 39/00
[52] U.S. Cl. .................. 180/91; 180/82 R; 293/118
[58] Field of Search ...................... 293/1, 2, 24, 60, 63, 293/70, 73; 180/82 R, 91, 93, 103 A; 296/35 B

[56] References Cited

U.S. PATENT DOCUMENTS

| | | | |
|---|---|---|---|
| 3,349,865 | 10/1967 | Deutsch | 180/93 |
| 3,806,184 | 4/1974 | Dean | 180/91 |
| 3,837,422 | 9/1974 | Schlanger | 180/91 |

*Primary Examiner*—Charles E. Frankfort
*Attorney, Agent, or Firm*—Allison C. Collard; Thomas M. Galgano

[57] ABSTRACT

An anti-nose-dive safety system, for a vehicle having a chassis and a pair of front and axle assemblies, includes a bumper assembly having a frame pivotably mounted on the chassis adjacent to the front end thereof, and a retractable bumper slidably mounted on the frame for movement between a normal, extended position and a retracted position, and a front end suspension assembly including an air piston arrestor pivotably coupled between each of the front end axle assemblies and the bumper assembly frame. Apparatus are coupled to the bumper assembly and chassis for raising the front end of the chassis in response to movement of the bumper from its normal position to its retracted position and apparatus are provided for arresting the air piston arrestors in a relatively rigid non-compressible state also in response to the retraction of the bumper. The safety system is especially suitable for compact cars.

15 Claims, 16 Drawing Figures

ANTI-NOSE-DIVE SAFETY SYSTEM FOR A VEHICLE

BACKGROUND OF THE INVENTION

This invention relates to a safety device for vehicles. More particularly, it relates to an anti-nose-dive safety system for vehicles.

Today, there is an increased awareness of the need for safer vehicles and, in particular, those used as passenger cars, so as to reduce the incidence of passenger fatalities, and injuries resulting from front end and head-on collisions. This has led to the development of improved bumper systems which are designed to absorb the force of impact of a car travelling at speeds of up to 5 m.p.h. without damage to the car's body.

This has also led to the development of air-bags which, located in the passenger compartment, are designed to inflate upon impact or collision, to prevent the passengers from being thrown forward against the windshield of the car, typically as a result of the front end of the car dipping upon impact. Collapsible steering wheels and padded dashboards have also been incorporated into new car models to further reduce the risk of injury during a collision.

While safety devices of this type have been found acceptable when the vehicles are travelling at relatively slow speeds, there has been general concern about their effectiveness at normal cruising speeds. Moreover, while these safety devices serve to minimize the adverse effects of the car nose-diving upon impact, so far as is known, none serve to directly eliminate this serious problem.

Accordingly, it is an object of the present invention to provide a novel safety system for vehicles which eliminates the problem of vehicle nose-diving upon collision and which controls the car's equilibrium to thereby place the occupants in a forward restraining position during the collision.

It is also an object of the present invention to provide such a safety system which is effective at normal cruising speeds so as to minimize the possibility of passenger fatalities and injuries resulting from front end and head-on collisions.

It is further object of the present invention to provide such a safety system which is relatively simple in design, economical to fabricate, durable, reliable in operation and which is readily adaptable for mass production on conventional vehicles.

It is still another object of the present invention to provide such a safety system which also minimizes serious damage to the vehicle's body and motor.

It is also a particular object of the present invention to provide a safety system having the foregoing attributes and characteristics which is especially suitable for small compact cars.

SUMMARY OF THE INVENTION

Certain of the foregoing and related objects are readily-attained in accordance with the present invention by the provision of an anti-nose-dive safety system for a vehicle having a chassis, including two parallel spaced-apart legs and a front-end axle assembly for each of the front wheels. The system includes a bumper assembly having a frame, one end of which is pivotably mountable on the chassis legs adjacent to the front end thereof and a retractable bumper slidably mounted on the frame for movement between a normal, extended position and a retracted position. A front-end suspension assembly is provided which includes an air piston arrestor, pivotably coupled between each of the front-end axle assemblies and the bumper assembly frame. Means are coupled to the bumper assembly and said chassis for raising the front end of the chassis in response to movement of the bumper from the normal position to the retracted position thereof, and means are also provided for arresting the air piston in a relatively rigid, non-compressible state also in response to movement of the bumper from the normal position to the retracted position thereof.

Preferably, the bumper assembly frame includes two generally parallel, spaced-apart hollow arms, each having a closed inner end which is pivotably mountable on one of the chassis legs and an open-outer end, and the bumper includes two generally parallel, spaced-apart push rods, each of which is telescopically received in one of the hollow arms of the frame. Most desirably, means are provided for biasely retaining the push rods in the arms. Most advantageously, such means may comprise a hydraulic cylinder mounted in each of the arms and which has a piston rod which is secured to the bumper push rods.

In a preferred embodiment, the push rods of the bumper have a toothed upper surface or rack, the chassis legs have a main gear rack plate attached thereto, having a generally vertically-disposed, toothed-peripheral edge, and the "means for raising" includes a gear housing mounted on each of the arms adjacent to the outer ends thereof and a main shaft rotatably supported in the housings and extending generally transversely to the chassis legs. A pair of first gears or pinions is fixed on the main shaft, each of which is in mesh with the toothed surface of one of the rods, and a pair of seconds gears is also fixed on the main shaft, each of which is in mesh with the toothed peripheral surface of one of the gear rack plates. The raising means advantageously also includes a second shaft rotatably supported in the housings and a pair of third gears, each of which is fixed on the second shaft and in mesh with one of the second gears to ensure synchronous movement of the second gears.

Most desirably, the gear rack plates, each has a channel formed in a lateral side thereof, spaced inwardly from and parallel to its toothed peripheral edge and gear housing each have at least one guide roller rotatably mounted thereon and slidably received in the channel. Advantageously, the bumper rods have a curved and tapered channel formed in a lateral side thereof and the chassis legs have a spring-loaded locking pin mounted thereon which is slidably receivable in the channel; the locking pin is disengageable from the curved channel upon retraction of the bumper rods.

In the preferred embodiment, each of the air piston arrestors includes a cylindrical jacket having an upper, closed end which is pivotably coupled to the main shaft and a lower, open end. The jackets have a vent opening adjacent to its upper, closed end, and a piston rod having a piston secured thereto at one end thereof is slidably received each of the jackets. The piston rods are pivotably coupled at their other ends to one of the front-end axle assemblies. Most desirably, the means for arresting the air piston arrestors includes a pair of vent shutters each of which is movable between an open and closed position relative to one of the vent openings and means for moving the shutters in response to movement of the bumper from the normal to the retracted position thereof.

The "means for moving" may desirably include a pair of cams fixed on the main shaft, adjacent to opposite ends thereof, and a pair of cam followers, each of which is secured to one of the shutters and each of which is disposed to ride on the periphery of one of the cams. Each cam has a substantially circular periphery and an inwardly notched portion formed in the circular periphery thereof. The cam followers when received in the notched portions maintain the shutters in an open position and when received on the circular periphery of the cams maintain the shutters in a closed position. Most preferably, the cam followers are each spring-loaded by means of a coil spring, one end of which is coupled to the shutter and the other end of which is coupled to the main shaft.

In a particularly preferred embodiment, the system additionally includes a retractable steering column assembly consisting of a steering column housing, and a steering shaft slidably received in the steering column housing and movable between an extended and retracted position. Means are provided for moving the steering shaft from the extended to the retracted position in respond to movement of the bumper from its normal position to its retracted position. Most desirably, the means for moving the steering shaft includes a pivotable latch mounted on the steering shaft having a latch pin which releasably engages with the column housing to maintain the shaft in an extended position, and a cable, one end of which is secured to the latch and the other of which is secured to the main shaft by means of a sheave, for winding thereon. The cable is wound on the sheave upon rotation thereof and, in turn, releases engagement of the latch pin with the steering column housing to permit retraction and collapse of the steering shaft.

Other object and features of the present invention will become apparent from the following detailed description when taken in connection with the accompanying drawings which disclose a single embodiment of the invention. It is to be understood that the drawings are designed for the purpose of illustration only, and are not intended as a definition of the limits and scope of the invention disclosed.

BRIEF DESCRIPTION OF THE DRAWINGS

In the drawings, wherein similar reference numerals denote similar elements throughout the several views.

DETAILED DESCRIPTION OF THE PREFERRED EMBODIMENT

Figure 3:
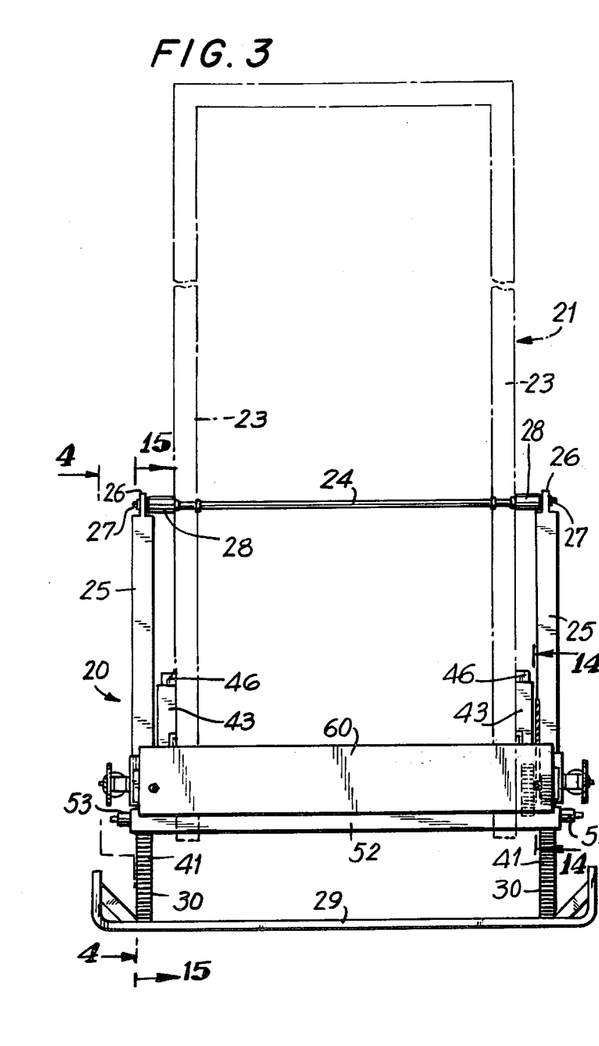
FIG. 3 is plan view of the safety system mounted on the car chassis (shown in phantom line)

Turning now in detail to the drawings, therein illustrated is a novel anti-nose-dive safety system for a vehicle embodying the present invention. As can be seen in FIG. 3, the system includes a retractable and pivotable bumper assembly 20 which is coupled to the chassis 21 of a vehicle 22 which includes two parallel, spaced-apart frame legs 23; except for FIG. 5, the chassis 21 is illustrated throughout the various views in phantom line for the purpose of clarity.

Figure 2:
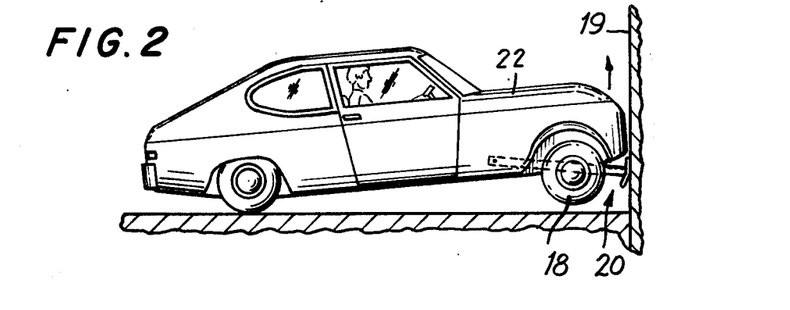
FIG. 2 is a view comparable to that of FIG. 1 of a car equipped with the novel anti-nose-dive safety system embodying the present invention showing the front end of the car raised by means of the safety system following full impact with the wall with the rear end axle and wheels fast to the road, and also showing the driver still sitting in a relatively upright position.

Bumper assembly 20 includes a mounting shaft 24 secured to, and extending normally between, frame legs 23; mounting shaft 24 is disposed generally near the front end of chassis 21 and, as shown in FIG. 2, it is located rearwardly of the front wheel 18 of the car 22. A pair of parallel elongated, tubular bumper arms 25, each having a generally square cross-section, and a closed and an open end, are each pivotably mounted on opposite ends of shaft 24, by means of an eyelet extension member 26 extending inwardly from their closed ends. As seen more clearly in FIG. 10, each of the eyelet extension members 26 is pivotably received on an opposite end of shaft 24 (to permit pivoting of arms 25 about the axis of shaft 24) and is held thereon by means of a nut 27. Arms 25 are spaced a suitable distance outwardly from frame legs 23 by means of two collars 28, each of which is received on shaft 24 and is positioned between one of the eyelet members 26 and one of the frame legs 23.

Figures 7, 8, 9:
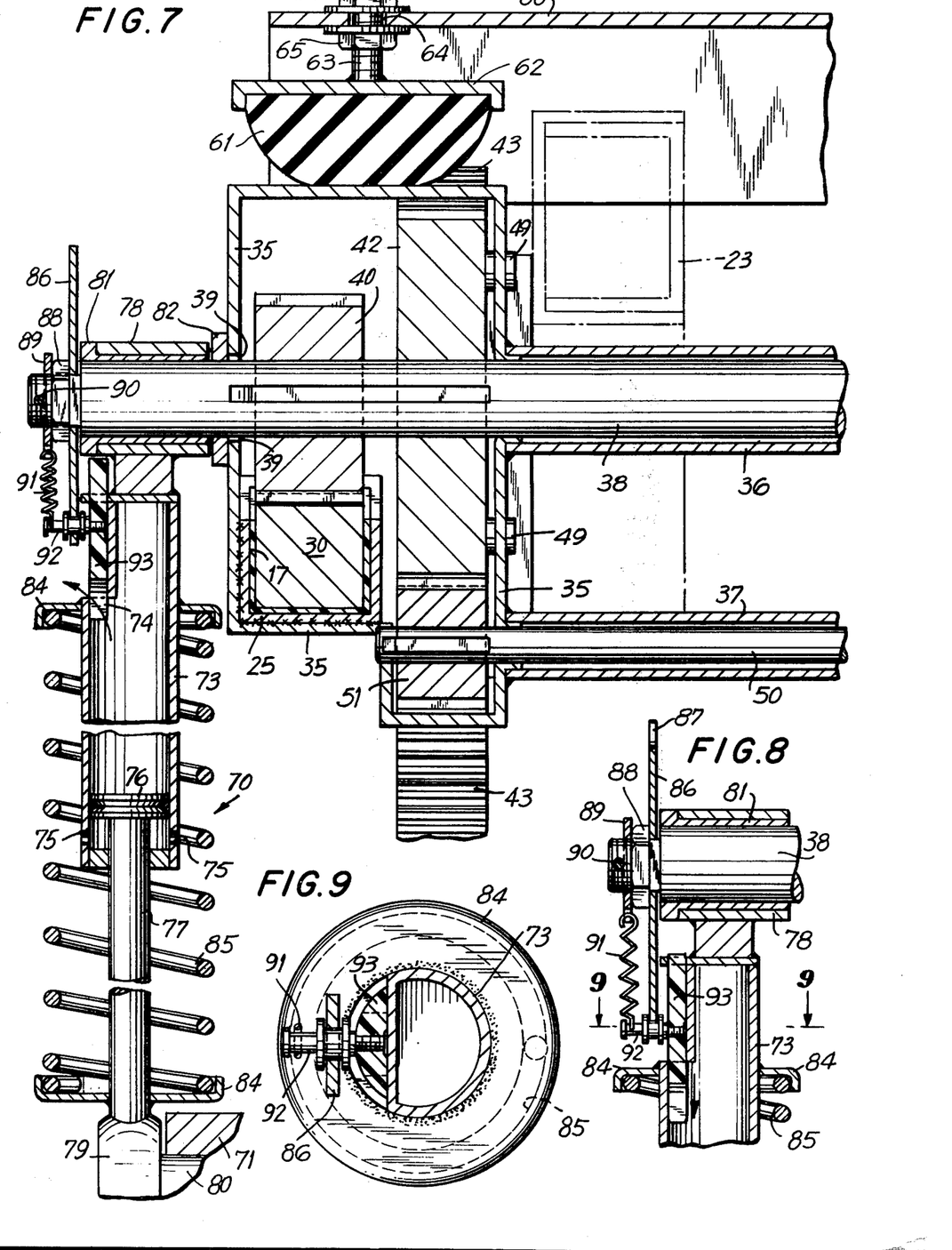
FIG. 7 is a fragmentarily-illustrated sectional view, in part elevation, taken along line 7—7 of FIG. 4.
FIG. 8 is a fragmentarily-illustrated, sectional view of a portion of the system shown in FIG. 7, but showing the position of the cam rotated to an arresting position to effect closing of the upper cylinder opening vent.
FIG. 9 is an enlarged, sectional view, in part elevation, taken along line 9—9 of FIG. 8.
Figure 12:
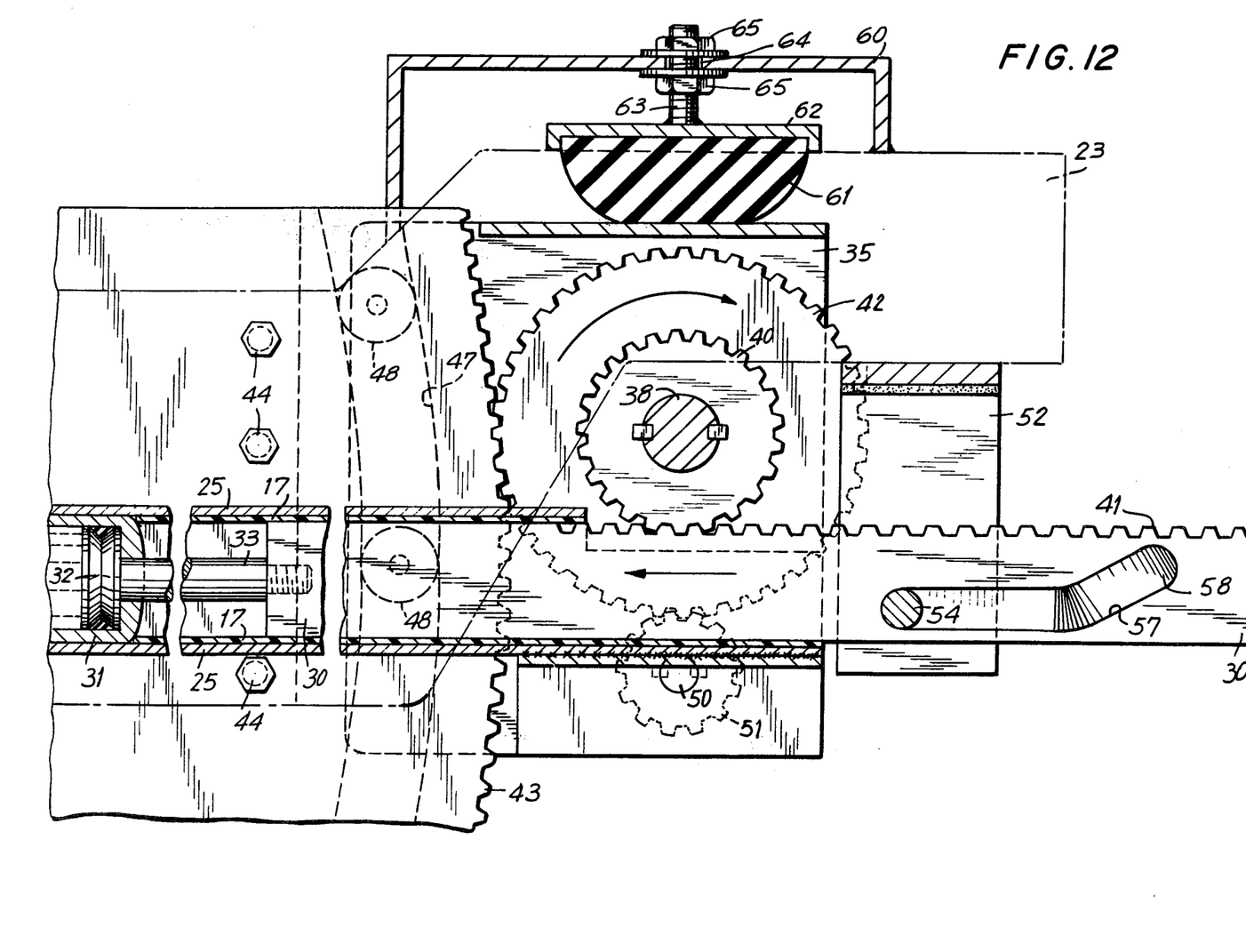
FIG. 12 is a fragmentarily-illustrated sectional view, in part elevation, taken along line 12—12 of FIG. 6.

Bumper assembly 20 also includes a retractable front bumper 29 having two elongated, spaced-apart, parallel, rectangular solid rods 30 secured to, and extending rearwardly from the inner surface thereof, with each rod 30 being disposed adjacent to one of the outer ends of bumper 29. Rods 30 are each slidably and telescopically received in one of the bumper arms 25 for reciprocable movement therein, between a normal extended position and, a retracted position; the latter position caused by impact of front bumper 29 with a relatively immovable barrier, such as a wall 19. As can be seen in FIGS. 7 and 12, arms 25 are lined with a nylon sleeve 17 to facilitate the sliding movement of bars 30.

Front bumper 29 is equipped to absorb the force of an impact when the vehicle strikes a barrier while travelling at relatively slow speeds, e.g., up to 10 m.p.h., by means of two suitably designed, long-stroke "hydraulic" cylinders 31, each of which (as partially illustrated in FIGS. 4 and 10) is mounted within one of the tubular arms 25, adjacent to the inner closed end thereof. A piston 32 is slidably received in each of cylinders 31 and is attached to one end of a piston rod 33. The other ends of the piston rods 33, disposed outwardly of cylinder 31, are each secured to the inner end of one of the bumper rods 30. As can be appreciated, cylinders 31 will serve to dissipate the force of impact when front bumper 29 strikes a barrier and is caused to retract. The retractable bumper and cylinder assembly may be designed to withstand the force of impact of a car travelling at 10 M.P.H. without damage to the car or injury to its occupants. It should also be noted that other means, such as a coil spring, may be employed to absorb the shock of the front bumper 29 upon impact.

Figure 6:
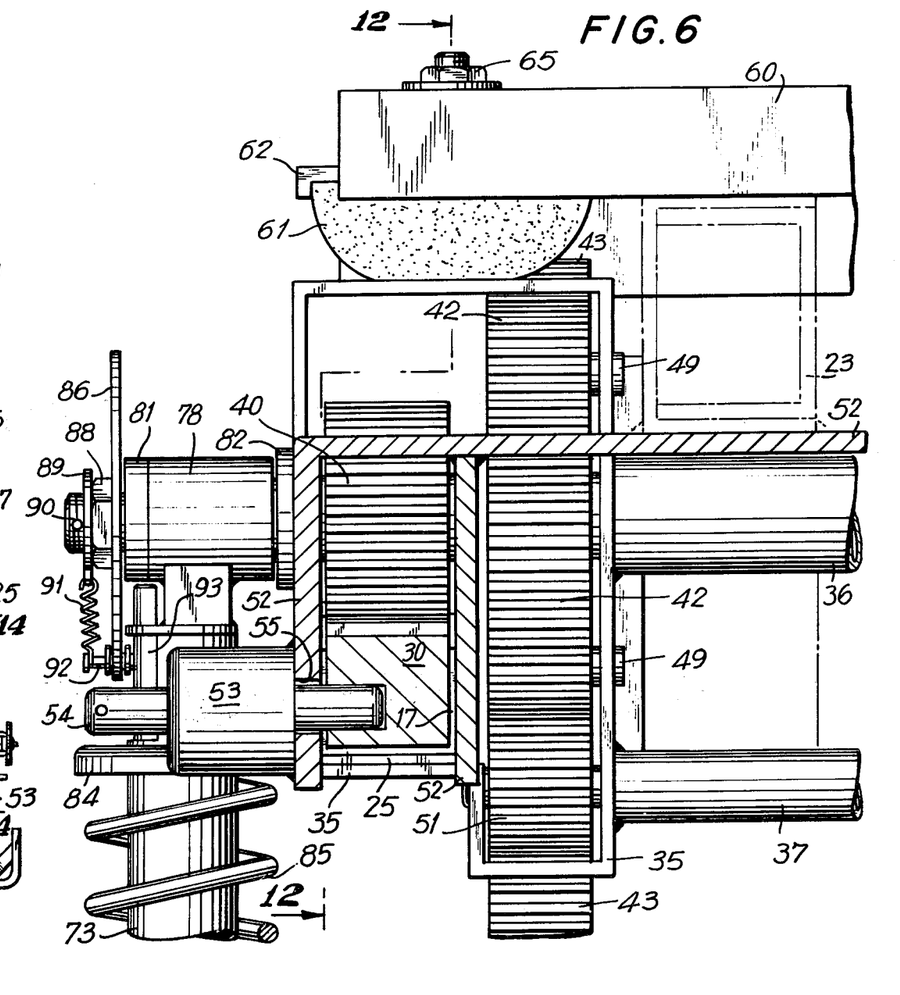
FIG. 6 is a fragmentarily-illustrated sectional elevational view, in part elevation, taken along line 6—6 of FIG. 4.

As can be seen more clearly in FIGS. 6 and 7, a generally box-shaped gear housing 35 is welded to, and encloses the outer end, of each of the arms 25. Housings 35 (only one of which is shown) are interconnected by a pair of parallel, spaced-apart cylindrical sleeves 36, 37 which extend transversely between chassis legs 23. A main shaft 38 is rotatably supported in sleeve 36 with its ends extending through a bore 39 in the outer lateral walls of gear housings 35. A pair of relatively small first gears or pinions 40 are fixed (by means of double keying) to the main shaft 38 and the teeth thereof are disposed to mesh with a toothed surface 41 provided on the upper surface of each of the bumper rods 30; as seen in FIG. 12, the outer end of the top wall of arms 25 is cut away to permit engagement of gears 40 with surfaces 41.

Figures 4, 5:
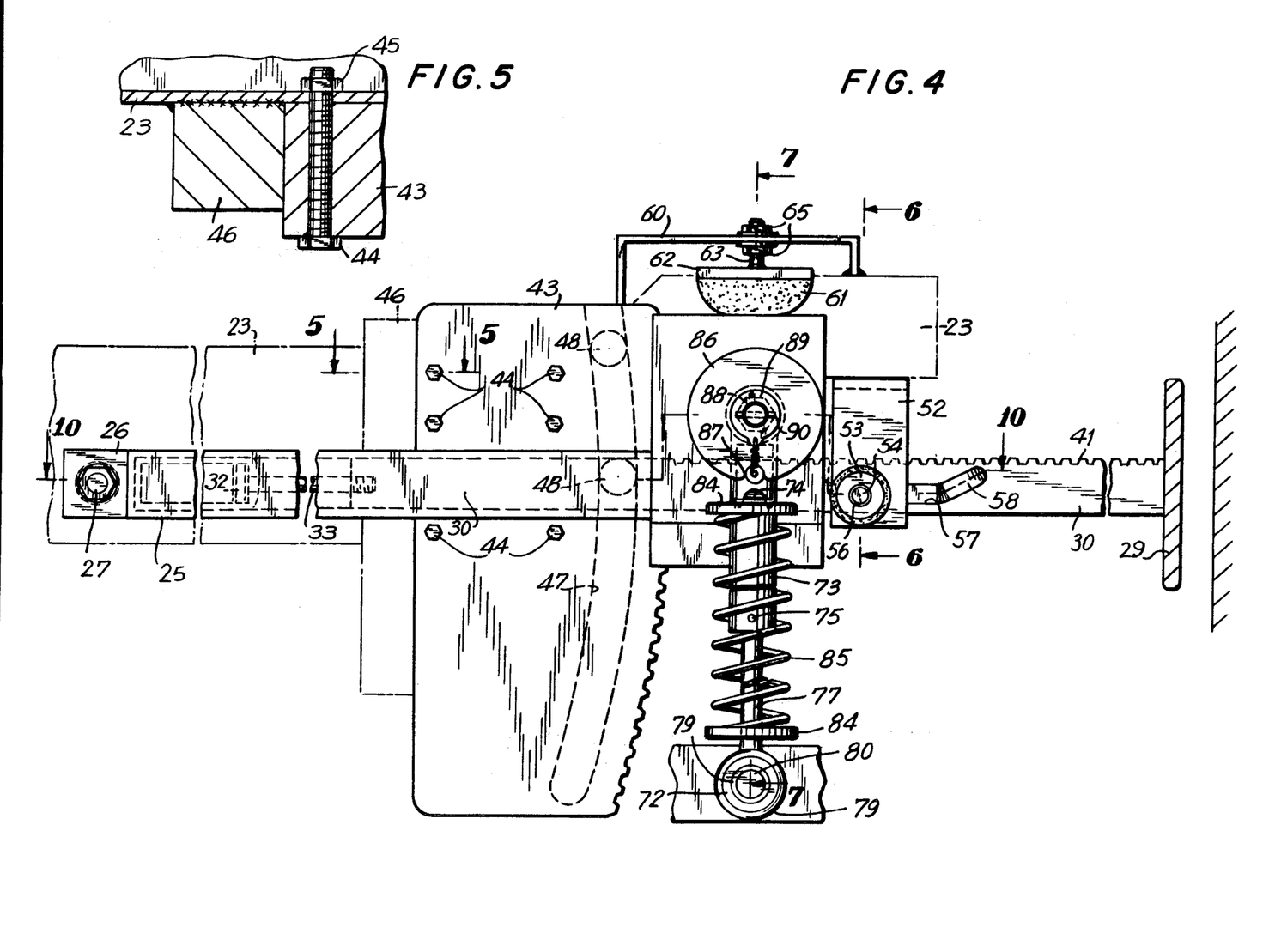
FIG. 4 is fragmentarily-illustrated side elevational view taken along line 4—4 of FIG. 3.
FIG. 5 is a fragmentarily-illustrated sectional view taken along line 5—5 of FIG. 4.
Figures 10, 11:
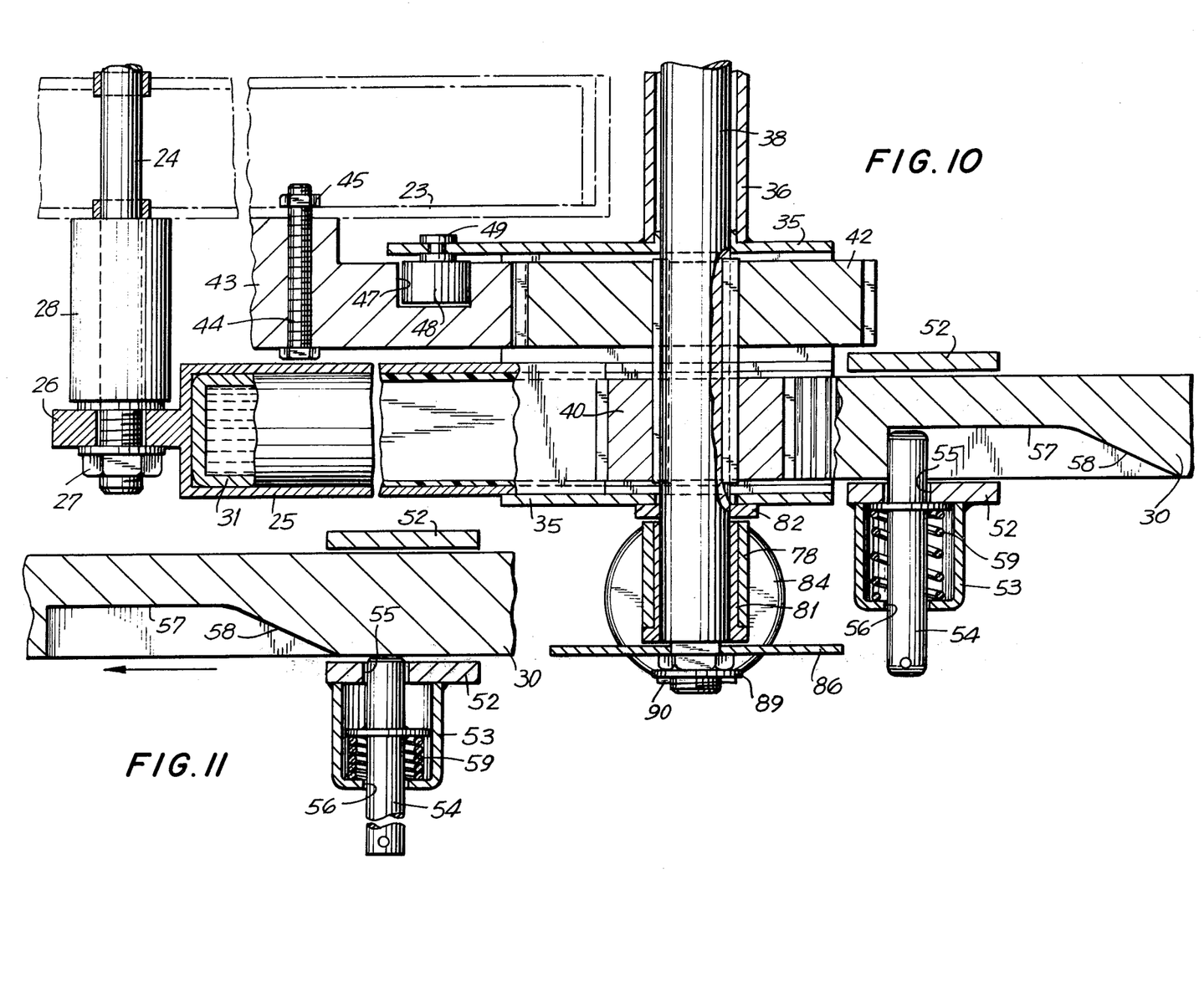
FIG. 10 is a fragmentarily-illustrated, sectional view, in part elevation, taken along line 10—10 of FIG. 4.
FIG. 11 is a fragmentarily-illustrated, sectional view, in part elevation, of a portion of the system shown in FIG. 10, but showing the position of the releasable locking pin assembly following retraction of the bumper assembly.

A pair of relatively larger second gears 42 are also fixed (by double keying) to main shaft 38, each of which is mounted adjacent to one of the first gears 40. The teeth of second gears 42 are disposed to mesh with the teeth of one of a pair of generally rectangular rack plates 43, as shown in FIGS. 4, 5 and 10. Rack plates 43 are each mounted on one of the chassis legs 23 by means of bolt 44 and nut 45 assemblies and are each rearwardly supported by a back-up bar 46 welded to each of the chassis legs 23. The teeth of rack plates 43 are provided along a vertically-extending slightly curved peripheral forward edge, and spaced inwardly and parallel thereto, a channel 47 is provided in the inner lateral surface of plates 43. Two guide rollers 48, rotatably supported on the inner lateral walls of each of the gear housings 35 by means of pin 49, are received in each of the channels 47 so as to guide the movement of the rack plates 43 and frame legs 23 relative to the bumper assembly 20.

An equalizing shaft 50 is rotatably supported in sleeve 37 and gear housing 35. Shaft 50 has a pair of third gears 51 fixed thereon (by double keying) at opposite ends thereof, each of which is in mesh with one of the second gears 42 mounted on shaft 38; Gears 51 and shaft 50 serve to ensure that gears 42 are driven at the same rate of rotation.

As seen in FIGS. 4, 6, 10 and 12, depending from the front end of each of the chassis legs 23 and extending therebetween, is a locking pin bracket plate 52 having two downwardly projecting spaced apart arms at each end thereof. On each of the outer lateral surfaces of the outer arms is mounted a cup-shaped locking pin housing 53. A spring-loaded locking pin 54 is supported in each of the housings 53 and extends through a bore 55 in bracket 52 and a bore 56 in the top of housing 53. The inner end of pin 54 is slidably received in an upwardly curved, generally U-shaped channel 57 formed in the outer lateral wall of each of the rods 30 of bumper 29. Channel 57 has a sloped base wall 58 in its forward end region which merges with the outer lateral wall of rod 30. This permits locking pin 54, which is normally received in the rear end region (FIG. 10) of channel 57 due to spring 59 (so as to maintain the chassis leg 23 and bumper rods 30 in a generally parallel and fixed relationship to one another), to move to a release position (FIG. 11), so as to permit upward pivoting of chassis legs 23 relative to bumper arms 25 and rods 30 (which will be discussed hereinafter in greater detail).

Also secured to, and lying above and across, the front ends of the chassis legs 23 is an inverted generally U-shaped top plate 60 from which depends two cushion assemblies. As shown in FIGS. 4, 6 and 7, each assembly includes a rubber semispherical pad 61 secured to a backing plate 62 which, in turn, has a threaded bolt 63 extending upwardly from the upper surface thereof. Bolt 63 is received through a bore 64 formed through top plate 60 and is secured to the top plate 60 by a pair of nuts 65. By the axial adjustment of bolts 65, pads 61 may be positioned such that, in their normal position (FIGS. 4 and 12), they each abut the top of one of gear housings 35 and act as a cushion therefor during vehicular travel.

As seen more clearly in FIGS. 7, 8 and 9, the safety system also includes two front end suspension assemblies 70 each of which is coupled between main shaft 38 and one of the conventional front end axle assemblies 71 for each of the front wheels 18. Each suspension assembly includes a long stroke pneumatic piston arrestor which includes a cylindrical hollow jacket 73 having an air vent opening 74 closely adjacent to its top end and air vents openings 75 adjacent to its open bottom end. A piston 76 attached to a piston rod 77 is slidably received in jacket 73 for generally vertical reciprocal movement therein. Jacket 73 has a generally cylindrical collar 78 secured to its upper closed end, by which it is pivotably mounted on the end of shaft 38. Similarly, the lower end of rod 77 has a generally cylindrical collar 79 secured to its lower end by which it is pivotably mounted on an axle 80 of the front axle assembly 71. Upper collar 78 is lined with a freely-rotatable cylindrical brass bushing 81 and is spaced from gear housing 35 by means of a brass washer 82. Lower collar 79 has an annular-shaped bushing 72 fixed between its inner and outer surfaces.

An annular spring backing plate 84 is secured about jacket 73 adjacent to its upper vent opening 74 and also about the piston rod 77 adjacent its lower end. A coil spring 85 is held in biased engagement between the two backing plates 84. Coil spring 85 and rubber pads 61 serve to replace the coil springs used in conventional front end suspension assemblies.

Fixed to each of the ends of shaft 38, outwardly of brass bushings 81, is a cam 86 having a generally circular periphery except for a single inwardly curved, notched portion 87. A nut 88 is threadably received on each end of shaft 38, outwardly of cams 86. A freely rotatable annular disc 89 is also received on each end of shaft 38 outwardly of nuts 88 and is held thereon by means of a cotter pin 90 received through the threaded tip of each end of shaft 38. One end of a coil spring 91 is secured to disc 89 and its other end is secured to the outer end of a cam follower 92 which is disposed to ride on the periphery of cam 86.

The inner end of cam follower 92 is secured to a substantially semicylindrical air vent cover plate or shutter 93 which is slidably supported on jacket 73 for movement between an open position (FIG. 7) and closed position (FIG. 8) relative to vent opening 74. When cam 86 is in its normal position, cam follower 92 is held in biased engagement, and received within, under the force of spring 91, notched portion 87 of cam 86 and it, in turn, will hold cover plate 93 in an open position, relative to vent opening 74. In this position, the air piston arrestor will function as a free-moving and non-vibrational device. However, when cam 86 is rotated, cam follower 92 will be forced out of the notched portion 87 and will, in turn, lower cover plate 93, causing it to close vent opening 74. As a result, upward movement of piston 76 and rod 77 in jacket 73 will be arrested in a substantially rigid, non-compressible state.

Figure 14:
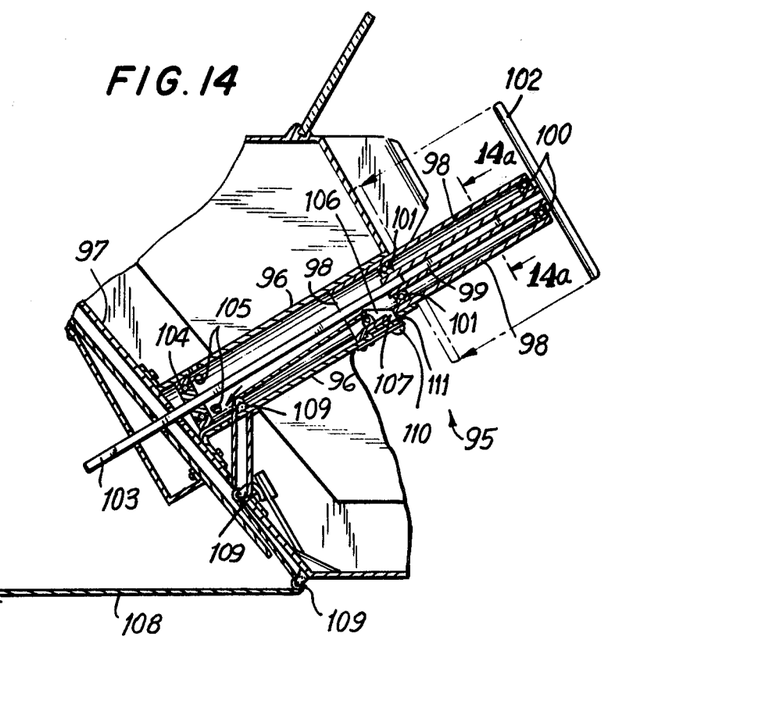
FIG. 14 is fragmentarily-illustrated elevational view, in part section, taken along line 14—14 of FIG. 3 and further showing a collapsible steering column assembly mounted in the forward car compartment and coupled to the safety system by means of a cable for cooperation therewith.
Figure 14A:
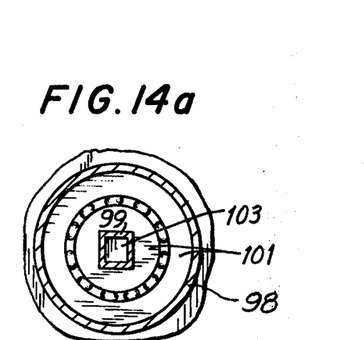
FIG. 14a is an enlarged fragmentarily-illustrated sectional view, in part elevation, taken along line 14a—14a of FIG. 14.

FIGS. 14 and 14a disclose a preferred embodiment of the invention, wherein the retractable bumper assembly 20 is coupled to and controls a retractable steering column assembly 95. Steering column assembly 95 includes a substantially cylindrical steering column housing support 96 bolted to the floor board 97 of the car 22. Telescopically and slidably received in housing support 96 is a steering column or shaft having an outer cylindrical tubular wall 98 and an inner tubular wall 99 having a square cross-section coupled together by means of upper and lower bearing assemblies 100, 101. The top end of inner wall 99 supports a steering wheel 102 and a steering shaft 103 having a square cross-section is telescopically and slidably received in its open bottom end; steering shaft 103 is rotatably supported in housing support 96 by a bearing assembly 104 and extends downwardly through the floor board 97. A pair of air vents 105 are provided in housing support 96. Pivotably supported on the inner surface of outer wall 98, adjacent its lower end, is an L-shaped latch 106. Latch 106 has an end 107 which serves as a latch pin and is normally received in a bore formed in the support housing 96, adjacent its upper end so as to support the steering column in an extended position. The opposite end of latch 106 is secured to one end of a cable 108. Cable 108, guided by pulleys 109, extends downwardly through housing 96 and through the floor board 97 and is coupled at its other end to shaft 38 by a sheave (not shown) so that it may be wound thereon in response to retraction of bumper 29. Upon coiling of cable 108 on the sheave mounted on shaft 38, latch pin 107 will be released from the housing support 96 to thus permit collapse and downwardly sliding of the steering column. A spring bar 110 is also mounted on support housing which has a pin 111 which serves to permit manual collapse of steering column; the pin 111 opposing the same bore as latch pin 107 so that it may be used to push in and release latch pin 107.

Figures 13, 15:
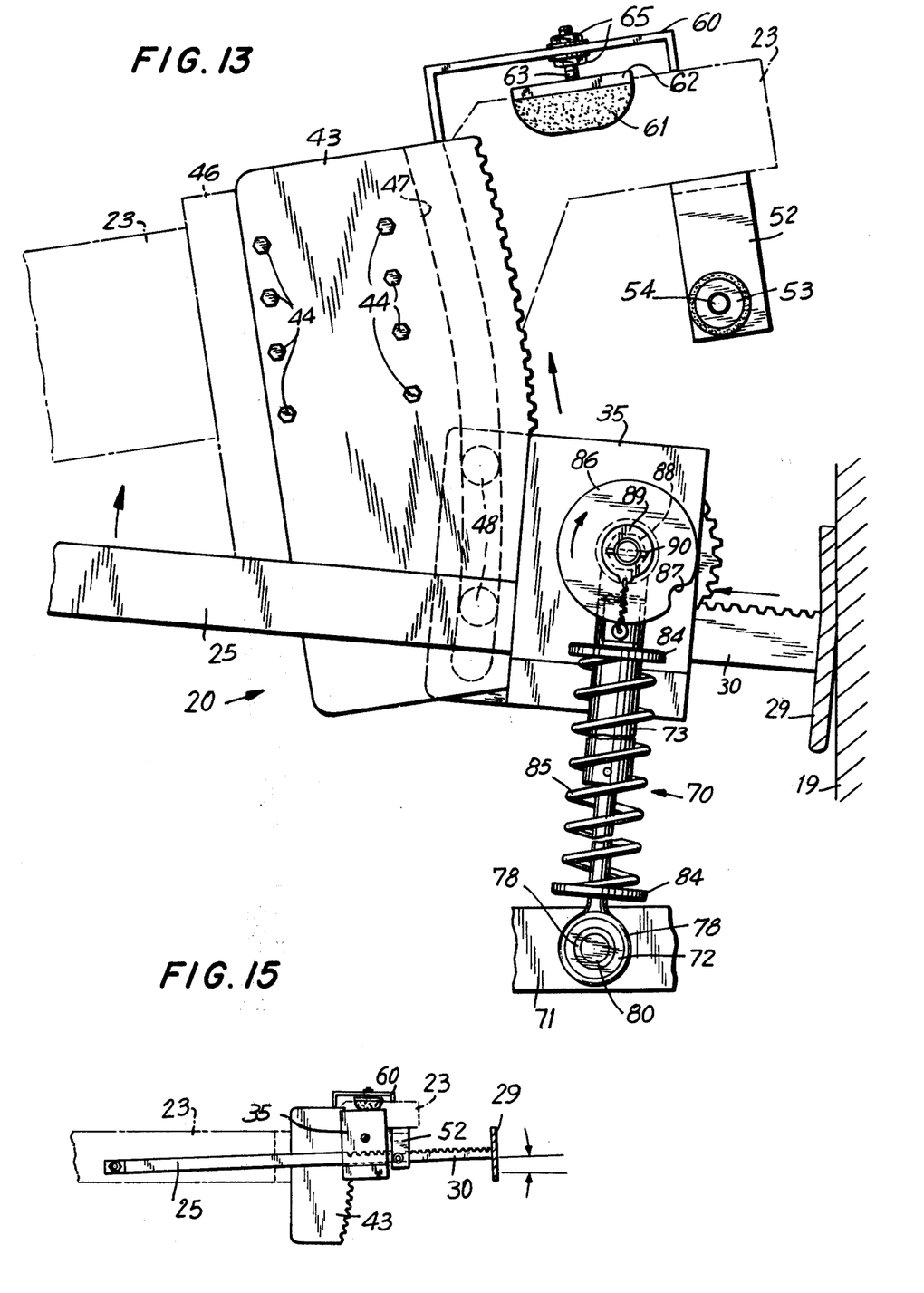
FIG. 13 is a fragmentarily-illustrated, side elevation view, in part section, of the safety system comparable to that of FIG. 12, but showing the relative positions of the elements of the system and the chassis following impact against a stationary wall.
FIG. 15 is a fragmentarily-illustrated side elevational view, in part section, taken along line 15—15 of FIG. 3.

Turning now to the overall operation, as shown in FIGS. 4, 7, 19, 12 and 15, under normal driving conditions, the safety system is effectively inoperative with bumper 29 in an extended position, and cover plate 93 in an open position relative to vent opening 74 so that the air piston arrestors operate only as a free moving device under normal conditions; as shown in FIG. 15, the device under bumper rods 30 are normally disposed about 1° to 2° above the horizontal axis of chassis 23. However, when bumper 29 strikes a wall 19 or another relatively immovable object, bumper rods 30 will retract within bumper arms 25, with their top toothed surfaces causing gears 40 to rotate in a clockwise direction. Rotation of gears will, in turn, cause shaft 38 and gears 42 to rotate in a clockwise direction. Rotation of shaft 38 will also cause rotation of cams 86 which, through cam followers 92, will move shutters 93 to a closing position relative to vent openings 74. Consequently, the air piston arrestors will be arrested in a relatively non-compression state to eliminate nose-diving of the car (FIGS. 2, 7, and 8)

Concurrently, with the rotation of shaft 38 and gears 42, gear plates 43 will ride up on gears 42 (guided by rollers 48) causing the front end of chassis 23 to be raised along with it (FIG. 13); simultaneously, with retraction of bumper rods 102, locking pin 54 rides in channel 57 and, is subsequently released therefrom to permit raising of chassis 23.

Where the safety system is also coupled to the collapsible steering assembly 95, as a result of rotation of shaft 38, cable 108 will be wound up thereon which, in turn, will cause release of latch 106. This, in turn, will cause instant collapse of the steering column.

Figure 1:
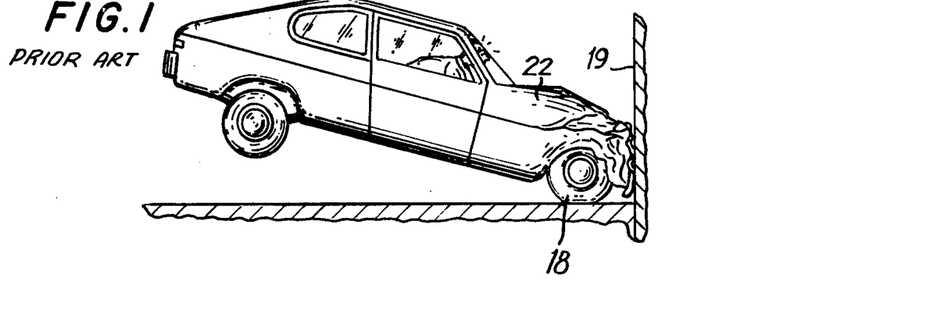
FIG. 1 is a side elevational view of car equipped with a conventional bumper system showing the front end of the car damaged and nose-diving downwardly after full impact with a wall, with the car's rear axle and wheels off the ground and also showing the driver's head striking the windshield.

As can be seen from the foregoing, in contrast to the front end collisions involving conventionally-equippped cars (FIG. 1), the present safety system prevents car nose-diving by "jacking up" the front end of the car by means of the gear assembly, automatically actuated upon impact (FIG. 2); this being facilitated by the arresting of the air piston arrestors to provide a relatively fixed pivot about which the chassis frame may be pivoted relative to the bumper arms.

It should be pointed out that other means, aside from purely mechanical, such as hydraulic or pneumatic or a combination thereof, may be incorporated between the front wheels and chassis to automatically raise the front end of the car in response to a collision. For instance, an air suspension bag assembly, interposed between the front wheels and chassis, operated by a high pressure cylinder, may be used to raise the front end of the car automatically upon impact.

Thus, while only one embodiment of the present invention have been shown and described, it will be obvious to those persons of ordinary skill in the art that many changes and modifications may be made thereunto without departing from the spirit and scope of the invention.

What is claimed is:

1. An anti-nose-dive safety system for a vehicle having a chassis, including two parallel spaced-apart legs and a front end axle assembly for each of the front wheels, comprising:
   a bumper assembly including a frame, one end of which is pivotably mountable on said chassis legs adjacent to the front end thereof and a retractable bumper slidably mounted on said frame for movement between a normal, extended position and a retracted position;

a front end suspension assembly including an air piston arrestor, pivotably coupled between each of the front end axle assemblies and said bumper assembly frame;

means coupled to said bumper assembly and said chassis for raising the front end of said chassis in response to movement of said bumper from said normal position to said retracted position thereof; and means for arresting said air piston arrestors in a relatively rigid, non-compressible state in response to movement of said bumper from said normal position to said retracted position thereof.

2. The system according to claim 1, wherein said bumper assembly frame includes two generally parallel, spaced apart hollow arms, each having a closed inner end which is pivotably mountable on one of said chassis legs and an open outer end, and wherein said bumper includes two generally parallel, spaced-apart rods each of which is telescopically received in one of said hollows arms of said frame.

3. The system according to claim 2, additionally including means for biasely retaining said rods in said arms.

4. The system according to claim 3, wherein said means for biasely retaining comprises a hydraulic cylinder mounted in each of said arms and which has a piston rod which is secured to said bumper rods.

5. The system according to claim 2, wherein said rods of said bumper have a toothed upper surface, wherein said chassis legs have a gear plate attached thereto, having a generally vertically-disposed, toothed peripheral edge, and wherein said means for raising includes a gear housing mounted on each of said arms adjacent to the outer ends thereof, a main gear shaft rotatably supported in said housings and extending generally transversely to said chassis legs, a pair of first gears fixed on said main shaft, each of which is in mesh with the toothed surface of one of said rods, and a pair of seconds gears fixed on said main shaft, each of which is in mesh with the toothed peripheral surface of one of said gear plates.

6. The system according to claim 5, additionally including a second shaft rotatably supported in said housings and a pair of third gears, each of which is fixed on said second shaft and in mesh with one of said second gears to ensure synchronous movement of said second gears.

7. The system according to claim 5, wherein said gear plates, each has a channel formed in a lateral side thereof, spaced inwardly from and parallel to its toothed peripheral edge and wherein said gear housings each have at least one guide roller rotatably mounted thereon and slidably received in said channel.

8. The system according to claim 5, wherein said rods, each have a curved channel formed in a lateral side thereof and wherein said chassis legs have a spring-loaded locking pin mounted thereon which is slidably receivable in said channel, said locking pin being disengageable from said curved channel upon retraction of said bumper rods.

9. The system according to claim 5, wherein each of said air piston arrestors includes a cylindrical jacket having an upper, closed end which is pivotably coupled to said main shaft and a lower, open end, said jackets having a vent opening adjacent to its upper, closed end, and a piston rod having a piston secured thereto at one end thereof which is slidably received in said jacket, said piston rod being pivotably coupled at its other end to one of said front axle assemblies.

10. The system according to claim 9 wherein said means for arresting said air piston arrestors includes a pair of shutters each of which is movable between an open and closed position relative to one of said vent openings and means for moving said shutters in response to movement of said bumper from said normal to said retracted position thereof.

11. The system according to claim 10, wherein said means for moving includes a pair of cams fixed on said main shaft, adjacent opposite ends thereof, and a pair of cam followers, each of which is secured to one of said shutters and each of which is disposed to ride on the periphery of one of said cams, said cams each having a substantially circular periphery and an inwardly notched portion formed in said circular periphery thereof, said cam followers when received in said notched portions maintaining said shutters in an open position and when received on the circular periphery of said cams maintaining said shutters in said closed position.

12. The system according to claim 11, wherein said cam followers are each spring-loaded by means of a coil spring, one end of which is coupled to said shutter and other end of which is coupled to said main shaft.

13. The system according to claim 9 additionally including a cushioning pad secured to and depending from each of said legs of said chassis which is disposed to normally rest upon said gear housing, a pair of spring backing plates, one of which is secured to and surrounds said jacket and the other of which is secured to and surrounds said piston rod, and a coil spring biasely retained between said pair of backing plates.

14. The system according to claim 5, additionally including a retractable steering wheel column assembly comprising a steering column housing, and a steering column slidably received in said steering column housing and movable between an extended and retracted position, and means for moving said steering column from said extended to said retracted position in respond to movement of said bumper from said normal position to said retracted position thereof.

15. The system according to claim 14, wherein said means for moving said steering shaft includes a pivotable latch mounted on said steering column having a latch pin which releasably engages with said column housing to maintain said shaft in an extended position, and a cable, one end of which is secured to said latch and the other of which is secured to said main gear shaft, for winding thereon, said cable being wound upon said shaft upon rotation thereof and, in turn, releasing engagement of said latch pin with said steering column housing to permit retraction and collapse of the steering wheel.

* * * * *

UNITED STATES PATENT OFFICE
CERTIFICATE OF CORRECTION

Patent No. 4,143,735 Dated March 13, 1979

Inventor(s) SAMUEL L. SCHLANGER

It is certified that error appears in the above-identified patent and that said Letters Patent are hereby corrected as shown below:

Column 10, line 48, delete "respond" and substitute therefor --response--.

Signed and Sealed this

Second Day of October 1979

[SEAL]

Attest:

RUTH C. MASON
Attesting Officer

LUTRELLE F. PARKER
Acting Commissioner of Patents and Trademarks